United States Patent
Sugita et al.

(10) Patent No.: US 12,291,090 B2
(45) Date of Patent: May 6, 2025

(54) VEHICLE CONTROL DEVICE, VEHICLE CONTROL SYSTEM, VEHICLE CONTROL METHOD, AND STORAGE MEDIUM

(71) Applicant: TOYOTA JIDOSHA KABUSHIKI KAISHA, Toyota (JP)

(72) Inventors: Yoshiya Sugita, Toyota (JP); Shutaro Tokunaga, Kariya (JP); Ryusuke Ishikawa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 405 days.

(21) Appl. No.: 17/658,892

(22) Filed: Apr. 12, 2022

(65) Prior Publication Data

US 2022/0339993 A1    Oct. 27, 2022

(30) Foreign Application Priority Data

Apr. 26, 2021    (JP) ................. 2021-074500

(51) Int. Cl.
*B60J 5/04*    (2006.01)
*B60J 5/10*    (2006.01)
*B60R 25/24*   (2013.01)
*G07C 9/00*    (2020.01)

(52) U.S. Cl.
CPC ............. *B60J 5/047* (2013.01); *B60J 5/10* (2013.01); *B60R 25/245* (2013.01); *G07C 9/00309* (2013.01); *G07C 2009/00333* (2013.01); *G07C 2009/00769* (2013.01); *G07C 2209/63* (2013.01)

(58) Field of Classification Search
None
See application file for complete search history.

(56) References Cited

U.S. PATENT DOCUMENTS

| 2016/0042580 | A1  | 2/2016  | Funayama |
|---|---|---|---|
| 2018/0225898 | A1  | 8/2018  | Kirkland et al. |
| 2022/0056752 | A1* | 2/2022  | An ........................ H04B 1/7163 |
| 2022/0412150 | A1* | 12/2022 | Johansson ............. E05F 15/611 |

FOREIGN PATENT DOCUMENTS

| JP | 2010-531268 A | 9/2010 |
|---|---|---|
| JP | 2016-37792 A  | 3/2016 |
| JP | 2018-184728 A | 11/2018 |

* cited by examiner

*Primary Examiner* — Hongye Liang
(74) *Attorney, Agent, or Firm* — Oblon, McClelland, Maier & Neustadt, L.L.P.

(57) ABSTRACT

A vehicle control device includes: an acquisition section configured to acquire a determination result for a first area indicating whether or not a predetermined communication terminal is in a predetermined first area outside a cabin of a vehicle, and to acquire a determination result for a second area indicating whether or not the communication terminal is in a second area that is further away from the vehicle than the first area; and a control section configured to perform a closing operation of a vehicle door based on the acquired determination result for the first area and on the acquired determination result for the second area.

9 Claims, 4 Drawing Sheets

VEHICLE CONTROL DEVICE, VEHICLE CONTROL SYSTEM, VEHICLE CONTROL METHOD, AND STORAGE MEDIUM

CROSS-REFERENCE TO RELATED APPLICATION

This application is based on and claims priority under 35 USC 119 from Japanese Patent Application No. 2021-074500 filed on Apr. 26, 2021, the disclosure of which is incorporated by reference herein.

BACKGROUND

Technical Field

The present disclosure relates to a vehicle control device, a vehicle control system, a vehicle control method, and a non-transitory storage medium stored with a vehicle control program for controlling opening and closing of a vehicle door.

Related Art

Japanese Patent Application Laid-Open (JP-A) No. 2018-184728 proposes a door control device which, on receiving a closing operation command for a sliding door provided to a vehicle, determines whether or not an occupant of the vehicle is positioned within a determination area set including the periphery of the sliding door. When the occupant moves outside this determination area after the closing operation command has been received, the door control device executes control to perform the sliding door closing operation and control to lock the sliding door.

Since closing of such a vehicle door is initiated even in a case in which a communication terminal such as an electronic key momentarily moves out of the determination area, an unintentional closing operation of the vehicle door might cause a user to feel unsettled.

SUMMARY

In consideration of the above circumstances, the present disclosure provides a vehicle control device, a vehicle control system, a vehicle control method, and a non-transitory storage medium stored with a vehicle control program that are capable of suppressing an unintentional closing operation of a vehicle door, and thereby reduce a user's unsettled feeling as a result.

A first aspect of the present disclosure is a vehicle control device including an acquisition section configured to acquire a determination result for a first area indicating whether or not a predetermined communication terminal is in a predetermined first area outside a cabin of a vehicle, and to acquire a determination result for a second area indicating whether or not the communication terminal is in a second area that is further away from the vehicle than the first area; and a control section configured to perform a closing operation of a vehicle door based on the acquired determination result for the first area and on the acquired determination result for the second area.

In this aspect, the acquisition section acquires the determination result as to whether or not the predetermined communication terminal is in the predetermined first area outside the vehicle cabin, and also acquires the determination result as to whether or not the communication terminal is in the second area that is further away from the vehicle than the first area.

The control section then controls the closing operation so as to close the vehicle door based on the determination result for the first area and on the determination result for the second area as acquired by the acquisition section. Thus, the closing operation of the vehicle door is not initiated even if the communication terminal momentarily moves out of the determination area, enabling an unintentional closing operation of the vehicle door to be suppressed, and suppressing a user from feeling unsettled as a result.

Note that the control section may be configured to control the closing operation of the vehicle door in cases in which a determination is made that the communication terminal is no longer in the second area after a previous determination has been made that the communication terminal was in the second area.

The control section may be configured to control the closing operation of the vehicle door in cases in which a determination is made that the communication terminal is in the second area after a determination has been made that the communication terminal is in the first area, and a determination is then made that the communication terminal is no longer in the second area after the previous determination has been made that the communication terminal was in the second area.

The control section may be configured to control the closing operation of the vehicle door in cases in which a determination is made that the communication terminal is in the second area after a previous determination has been made that the communication terminal was not in the first area, and a determination is then made that the communication terminal is no longer in the second area after the previous determination has been made that the communication terminal was in the second area.

The control section may be configured to control the closing operation of the vehicle door in cases in which a determination is made that the communication terminal is no longer in the first area after a previous determination has been made that the communication terminal was in the first area, a determination is then made that the communication terminal is in the second area after the determination that the communication terminal is no longer in the first area, and a determination is then made that the communication terminal is no longer in the second area after the determination has been made that the communication terminal was in the second area.

The first area may be an area contained in the second area, or the first area may be an area adjacent to the second area without being contained in the second area.

A vehicle control system may be configured including the vehicle control device of the first aspect, the communication terminal, and a drive section configured to perform drive opening and closing of the vehicle door under control of the control section.

A second aspect of the present disclosure is a vehicle control method including: acquiring a determination result for a first area indicating whether or not a predetermined communication terminal is in a predetermined first area outside a cabin of a vehicle, and acquiring a determination result for a second area indicating whether or not the communication terminal is in a second area that is further away from the vehicle than the first area; and performing a closing operation of a vehicle door based on the acquired determination result for the first area and on the acquired determination result for the second area.

A third aspect of the present disclosure is a non-transitory storage medium storing a program executable by a computer to perform vehicle control processing, the vehicle control processing including: acquiring a determination result for a first area indicating whether or not a predetermined communication terminal is in a predetermined first area outside a cabin of a vehicle, and acquiring a determination result for a second area indicating whether or not the communication terminal is in a second area that is further away from the vehicle than the first area; and performing a closing operation of a vehicle door based on the acquired determination result for the first area and on the acquired determination result for the second area.

As described above, the present disclosure enables the provision of a vehicle control device, a vehicle control system, a vehicle control method, and a non-transitory storage medium stored with a vehicle control program that are capable of suppressing an unintentional closing operation of the vehicle door, and thereby reduce the user's unsettled feeling as a result.

DETAILED DESCRIPTION

Figure 1:
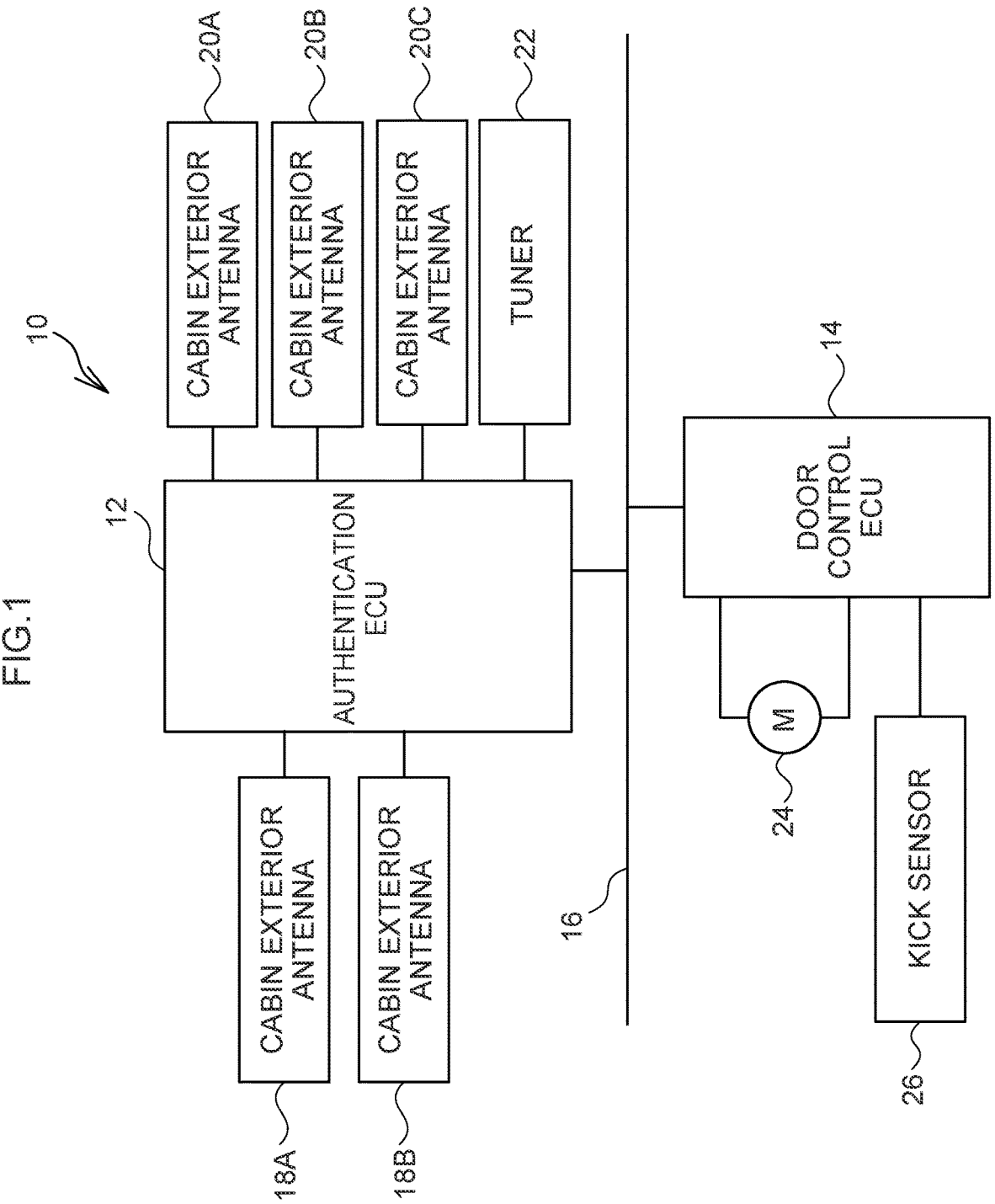
FIG. 1 is a block diagram illustrating an example of a schematic configuration of a vehicle door opening/closing device according to an exemplary embodiment.
Figure 2:
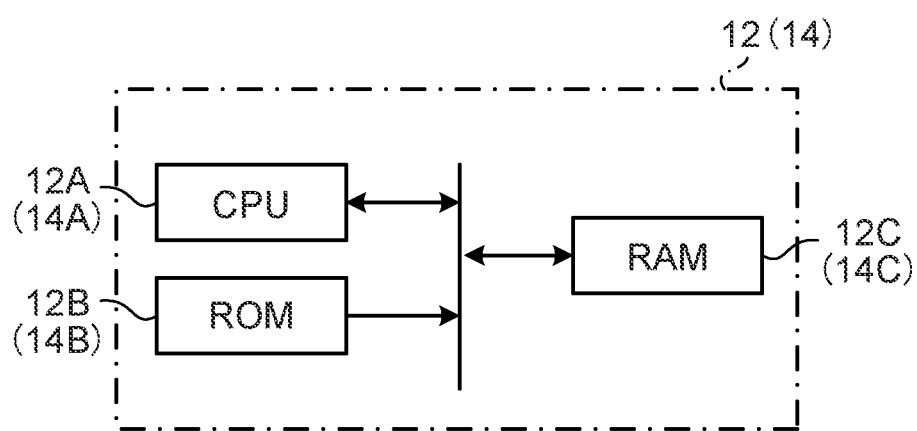
FIG. 2 is a block diagram illustrating a schematic configuration of an authentication ECU and a door control ECU of a vehicle door opening/closing device according to an exemplary embodiment.
Figure 3:
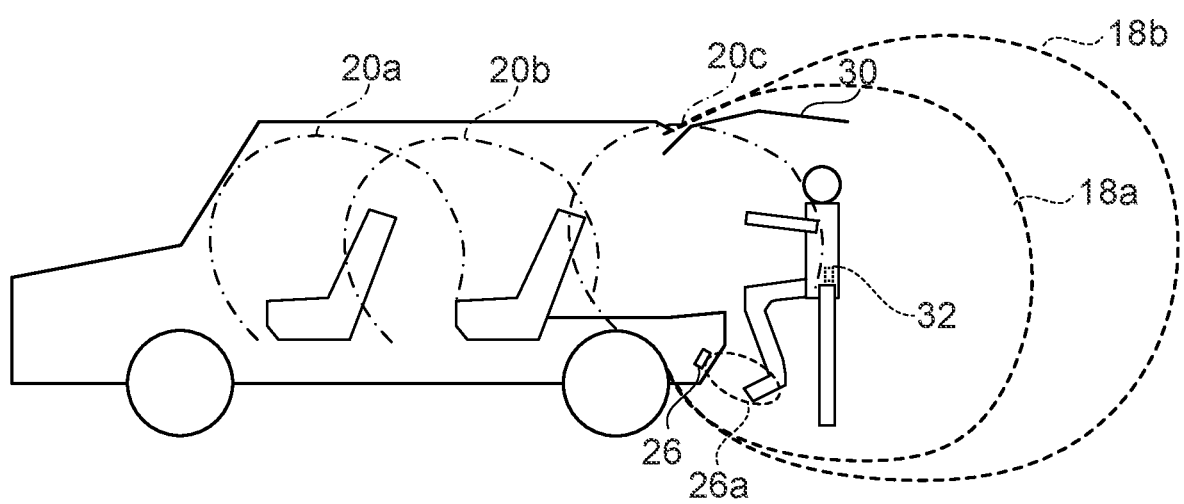
FIG. 3 is a side view cross-section illustrating an example of a schematic configuration of a vehicle according to an exemplary embodiment.

Detailed explanation follows regarding an example of an exemplary embodiment of the present disclosure, with reference to the drawings. In the exemplary embodiment, a vehicle door opening/closing device for controlling opening and closing of a vehicle door is described as an example of a vehicle control system. FIG. 1 is a block diagram illustrating an example of a schematic configuration of the vehicle door opening/closing device according to the exemplary embodiment. FIG. 2 is a block diagram illustrating a schematic configuration of an authentication ECU and a door control ECU of the vehicle door opening/closing device according to the exemplary embodiment. FIG. 3 is a side view cross-section illustrating an example of a schematic configuration of a vehicle according to the exemplary embodiment.

First, explanation follows regarding a configuration of a vehicle door opening/closing device 10 according to the exemplary embodiment, with reference to FIG. 1 to FIG. 3. As illustrated in FIG. 1, the vehicle door opening/closing device 10 includes an authentication electronic control unit (ECU) 12 and a door control ECU 14.

As illustrated in FIG. 2, the authentication ECU 12 is configured by a microcomputer including a central processing unit (CPU) 12A, read only memory (ROM) 12B, random access memory (RAM) 12C, and so on. Cabin exterior antennae 18A, 18B, cabin interior antennae 20A to 20C, and a tuner 22 are connected to the authentication ECU 12.

As illustrated in FIG. 2, the door control ECU 14 is similarly configured by a microcomputer including a CPU 14A, ROM 14B, RAM 14C, and so on. An actuator 24, serving as a drive section, and a kick sensor 26 are connected to the door control ECU 14. The authentication ECU 12 and the door control ECU 14 are both connected to an onboard network 16 such as a controller area network (CAN).

As illustrated in FIG. 3, the cabin exterior antennae 18A, 18B receive a signal emitted by an electronic key 32, serving as a communication terminal, when present within respective predetermined reception ranges 18a, 18b of a vehicle cabin exterior area. The cabin interior antennae 20A to 20C receive the signal emitted by the electronic key 32 when present within respective predetermined reception ranges 20a to 20c of a vehicle cabin interior area. Although as illustrated in FIG. 3 an example is given in which the reception range 18a is contained in the reception range 18b in the present exemplary embodiment, the reception range 18a may be adjacent to the reception range 18b without being contained in the reception range 18b. Moreover, the reception ranges 18a, 18b and the reception range 20c may either partially overlap one another, or not overlap one another. The number of antennae configuring the cabin exterior antennae 18A, 18B and the cabin interior antennae 20A to 20C are not limited to the number in the example illustrated in FIG. 1, and may be set as appropriate in response to reception ranges of the respective antennae, the desired reception accuracy, and so on. In the following explanation, reference may be made to the first reception range 18a and the second reception range 18b when distinguishing between the reception range 18a and the reception range 18b. The first reception range 18a corresponds to a first area, and the second reception range 18b corresponds to a second area.

The authentication ECU 12 authenticates the electronic key 32 located outside the vehicle cabin (hereafter referred to as a "vehicle cabin exterior authentication") based on the signal from the electronic key 32 received by the cabin exterior antenna 18A or 18B. The authentication ECU 12 similarly authenticates the electronic key 32 located inside the vehicle cabin (hereafter referred to as a "vehicle cabin interior authentication") based on the signal from the electronic key 32 received by one of the cabin interior antennae 20A to 20C.

Specifically, in cases in which the electronic key 32 is not present within the reception ranges 18a, 18b, the authentication ECU 12 determines that the vehicle cabin exterior authentication has failed. In cases in which the electronic key 32 is present within the reception range 18a or 18b but a key ID of the electronic key 32 does not match a predetermined key ID serving as a key ID corresponding to the ego (local) vehicle, the authentication ECU 12 determines that the vehicle cabin exterior authentication has failed. Furthermore, in cases in which the electronic key 32 is present within the reception range 18a or 18b and the key ID of the electronic key 32 matches the predetermined key ID serving as the key ID corresponding to the ego vehicle, the authentication ECU 12 determines that the vehicle cabin exterior authentication is normal (i.e., succeeded).

In cases in which the electronic key 32 is not present within any of the reception ranges 20a to 20c, the authentication ECU 12 determines that the vehicle cabin interior authentication has failed. In cases in which the electronic key 32 is present within any of the reception ranges 20a to 20c but the key ID of the electronic key 32 does not match the predetermined key ID serving as the key ID corresponding to the ego vehicle, the authentication ECU 12 determines that the vehicle cabin interior authentication has failed. Furthermore, in cases in which the electronic key 32 is present within any of the reception ranges 20a to 20c and the key ID of the electronic key 32 matches the predetermined key ID serving as the key ID corresponding to the ego vehicle, the authentication ECU 12 determines that the vehicle cabin interior authentication is normal (i.e., succeeded).

The tuner 22 adjusts the respective reception ranges 18a, 18b of the cabin exterior antennae 18A, 18B and the respective reception ranges 20a to 20c of the cabin interior antennae 20A to 20C under the control of the authentication ECU 12.

The actuator 24 opens and closes a vehicle door 30 (see FIG. 3) at a vehicle rear section under the control of the door control ECU 14.

As illustrated in FIG. 3, the kick sensor 26 may for example be provided inside a rear bumper so as to detect for a detection target at the periphery of the vehicle door 30. Specifically, the kick sensor 26 is an electrostatic sensor including a sensor electrode. The kick sensor 26 detects for the detection target (e.g., a leg of a user in the present exemplary embodiment) within a predetermined detection range 26a by detecting changes in electrostatic capacitance between the sensor electrode and the detection target.

Note that the kick sensor 26 is not limited to being an electrostatic sensor, and another member capable of detecting the detection target, such as an infrared sensor or a physical switch, may be employed therefor. Moreover, the installation position of the kick sensor 26 is not limited to being inside the rear bumper, and may be another position where the detection target can be detected, such as under the vehicle or in a rear garnish. Alternatively, the kick sensor 26 may be omitted.

Moreover, a switch to instruct opening and closing of the vehicle door 30 is provided to the electronic key 32, and an instruction to open or close the vehicle door 30 may be issued by operating this switch.

The door control ECU 14 controls the actuator 24 so as to perform closing of the vehicle door 30 based on a determination result of the vehicle cabin interior authentication and a determination result of the vehicle cabin exterior authentication by the authentication ECU 12, and on a switch operation of the electronic key 32 or a detection result by the kick sensor 26.

Note that in the exemplary embodiment, the door control ECU 14 corresponds to a vehicle control device, and functions as an example of an acquisition section and a control section.

Figure 4:
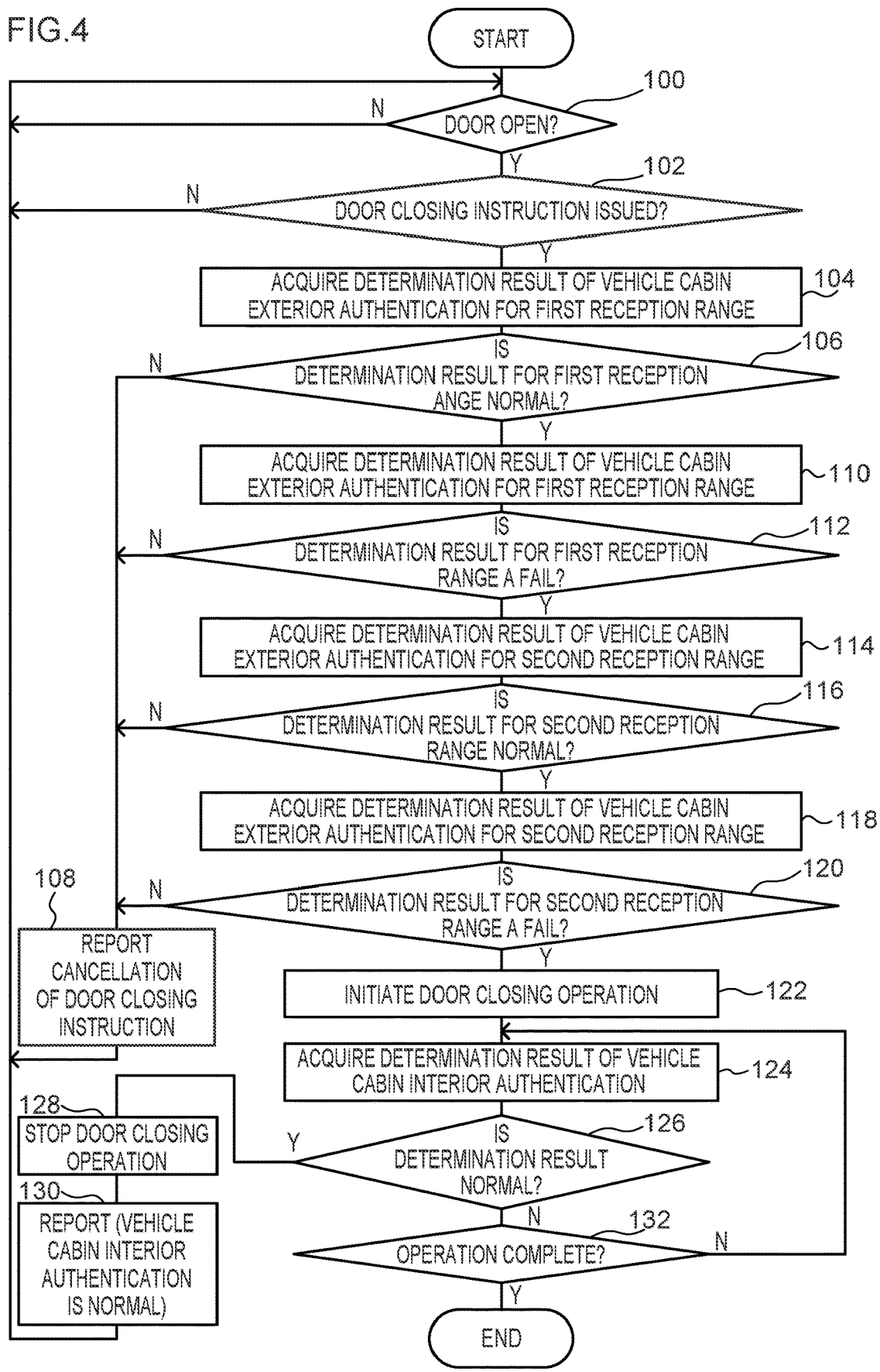
FIG. 4 is a flowchart illustrating an example of a flow of processing executed by a door control ECU of a vehicle door opening/closing device according to an exemplary embodiment.

Next, explanation follows regarding specific processing performed by the door control ECU 14 of the vehicle door opening/closing device 10 according to the exemplary embodiment, with reference to FIG. 4. FIG. 4 is a flowchart illustrating an example of a flow of processing executed by the door control ECU 14 of the vehicle door opening/closing device 10 according to the exemplary embodiment. In the exemplary embodiment, the processing illustrated in FIG. 4 is performed by the door control ECU 14 executing a program stored in advance in the ROM. Execution of the processing illustrated in FIG. 4 is for example initiated in cases in which the vehicle door 30 has shifted from a closed state to an open state.

At step 100, the CPU 14A determines whether or not the vehicle door 30 has been placed in the open state based on a state of a non-illustrated courtesy switch. Processing returns to step 100 in cases in which this determination is negative, whereas processing transitions to step 102 in cases in which this determination is affirmative.

At step 102, the CPU 14A determines whether or not a door closing instruction has been issued. This determination involves for example determining whether or not the door closing instruction has been issued by operation of the switch on the electronic key 32, or determining whether or not the detection target has been detected by the kick sensor 26. Alternatively, in cases in which a switch or the like for issuing a vehicle door closing instruction is provided separately to the kick sensor 26, determination may be made as to whether or not a door closing instruction has been issued using this switch. Processing returns to step 100 in cases in which this determination is negative, whereas processing transitions to step 104 in cases in which this determination is affirmative.

At step 104, the CPU 14A causes the authentication ECU 12 to execute a vehicle cabin exterior authentication for the first reception range 18a, acquires a determination result of the vehicle cabin exterior authentication for the first reception range 18a by the authentication ECU 12, and transitions to step 106.

At step 106, the CPU 14A determines whether or not the determination result of the vehicle cabin exterior authentication for the first reception range 18a acquired at step 104 is normal. Processing transitions to step 108 in cases in which this determination is negative, whereas processing transitions to step 110 in cases in which this determination is affirmative.

At step 108, the CPU 14A reports that the door closing instruction has been cancelled before returning to step 100 and repeating the processing described above. Specifically, the CPU 14A may for example generate an alert sound in order to report that the door closing instruction has been cancelled. Note that the CPU 14A may report that the door closing instruction has been cancelled using a flashing lamp rather than an alert sound. Alternatively, the CPU 14A may report that the door closing instruction has been cancelled using both an alert sound and a flashing lamp.

On the other hand, at step 110, the CPU 14A causes the authentication ECU 12 to execute a vehicle cabin exterior authentication for the first reception range 18a, acquires a determination result of the vehicle cabin exterior authentication for the first reception range 18a by the authentication ECU 12, and transitions to step 112.

At step 112, the CPU 14A determines whether or not the determination result of the vehicle cabin exterior authentication for the first reception range 18a acquired at step 110 is a fail. This determination is negative in cases in which the determination result of the vehicle cabin exterior authentication for the first reception range 18a has not become a fail after a predetermined duration has elapsed. Processing transitions to step 108 in cases in which this determination is negative, whereas processing transitions to step 114 in cases in which this determination is affirmative. Note that this predetermined duration may for example be set as a duration corresponding to a duration required for the user who issued the door closing instruction to move from inside the first reception range to outside the first reception range.

At step 114, the CPU 14A causes the authentication ECU 12 to execute a vehicle cabin exterior authentication for the second reception range 18b, acquires a determination result of the vehicle cabin exterior authentication for the second reception range 18b by the authentication ECU 12, and transitions to step 116.

At step 116, the CPU 14A determines whether or not the determination result of the vehicle cabin exterior authentication for the second reception range 18b acquired at step 114 is normal. This determination is negative in cases in which the determination result of the vehicle cabin exterior authentication for the second reception range 18b has not become normal after a predetermined duration has elapsed. Processing transitions to step 108 in cases in which this determination is negative, whereas processing transitions to step 118 in cases in which this determination is affirmative. Note that this predetermined duration may for example be set as a duration corresponding to a duration required for the user who issued the door closing instruction to move into the second reception range after moving outside the first reception range.

At step 118, the CPU 14A causes the authentication ECU 12 to execute a vehicle cabin exterior authentication for the second reception range 18b, acquires a determination result of the vehicle cabin exterior authentication for the second reception range 18b by the authentication ECU 12, and transitions to step 120.

At step 120, the CPU 14A determines whether or not the determination result of the vehicle cabin exterior authentication for the second reception range 18b acquired at step 118 is a fail. This determination is negative in cases in which the determination result of the vehicle cabin exterior authentication for the second reception range 18b has not become a fail after a predetermined duration has elapsed. Processing transitions to step 108 in cases in which this determination is negative, whereas processing transitions to step 122 in cases in which this determination is affirmative. Note that this predetermined duration may for example be set as a duration corresponding to a duration required for the user who issued the door closing instruction to move from inside the second reception range to outside the second reception range.

At step 122, the CPU 14A controls the actuator 24 so as to initiate a closing operation of the vehicle door 30, and transitions to step 124.

At step 124, the CPU 14A causes the authentication ECU 12 to execute a vehicle cabin interior authentication, acquires a determination result of the vehicle cabin interior authentication by the authentication ECU 12, and transitions to step 126.

At step 126, the CPU 14A determines whether or not the determination result of the vehicle cabin interior authentication acquired at step 124 is normal. Namely, determination is made as to whether or not the electronic key 32 has been locked inside the vehicle. Processing transitions to step 128 in cases in which this determination is affirmative, whereas processing transitions to step 132 in cases in which this determination is negative.

At step 128, the CPU 14A controls the actuator 24 so as to stop the closing operation of the vehicle door 30, and transitions to step 130. Note that the vehicle door 30 may be returned to its open position after the closing operation of the vehicle door 30 has been stopped.

At step 130, the CPU 14A reports that the determination result of the vehicle cabin interior authentication is normal before returning to step 100 and repeating the processing described above. Specifically, the CPU 14A may for example generate an alert sound indicating that the determination result of the vehicle cabin interior authentication is normal, and that the electronic key 32 is locked inside the vehicle. Note that the CPU 14A may report that the determination result of the vehicle cabin interior authentication is normal using a flashing lamp rather than an alert sound. Alternatively, the CPU 14A may report that the determination result of the vehicle cabin interior authentication is normal using both an alert sound and a flashing lamp. The reporting at step 130 may involve the same processing as the reporting at step 108.

On the other hand, at step 132, the CPU 14A determines whether or not the closing operation of the vehicle door 30 is complete. Namely, determination is made as to whether or not the closing operation of the vehicle door 30 has continued and this closing operation is now complete. Processing returns to step 124 and the processing described above is repeated in cases in which this determination is negative, whereas the series of processing is ended in cases in which this determination is affirmative.

By performing the processing in this manner, control of a closing operation of the vehicle door is performed based on the authentication result of the electronic key 32 with respect to the first reception range 18a and the second reception range 18b at the vehicle cabin exterior. Thus, the closing operation of the vehicle door 30 is not initiated even if the electronic key 32 momentarily moves out of the authentication area, enabling an unintentional closing operation of the vehicle door to be suppressed, and thereby reduce the user's unsettled feeling as a result.

Note that in the processing of FIG. 4, steps 104, 110, 114, and 118 correspond to an example of an acquisition section, and steps 106, 112, 116, 120, and 122 correspond to an example of a control section.

Moreover, although in the processing of FIG. 4 determination is made at step 102 as to whether or not a door closing instruction has been issued, after which determination is made at steps 104 to 106 as to whether or not the determination result for the first reception range is normal, the processing sequence is not limited thereto. For example, the processing of step 102 may be performed after that of step 106.

Moreover, although in the processing of FIG. 4 a closing instruction for the vehicle door 30 is received by the electronic key 32 or the kick sensor 26, there is no limitation thereto. For example, the processing of step 102 in FIG. 4 may be omitted, namely, control of the closing operation of the vehicle door 30 may be performed in cases in which an occupant has moved away from the vehicle.

Moreover, although an example has been described in which the exemplary embodiment is applied to the vehicle door 30 at the vehicle rear section, there is no limitation to a vehicle door at the vehicle rear section, and application may be made to a vehicle door at another position.

Note that although the processing executed by the door control ECU 14 in the above exemplary embodiment is described as software processing performed by executing a program, there is no limitation thereto. For example, the processing may be performed by hardware such as a graphics processing unit (GPU), an application specific integrated circuit (ASIC), or a field-programmable gate array (FPGA). Alternatively, the processing may be performed by a combination of both software and hardware. Moreover, in cases in which the processing is software processing, the program may be stored and distributed on various storage media.

Furthermore, the present disclosure is not limited to the above description, and obviously various other modifications may be implemented within a range not departing from the spirit of the present disclosure.

What is claimed is:
1. A vehicle control device comprising:
a memory; and
a processor that is coupled to the memory and configured to:

perform a first determination for a first area indicating whether or not a communication terminal is in a first area outside a cabin of a vehicle;

perform a second determination for a second area indicating whether or not the communication terminal is in a second area that is farther away from the vehicle than the first area;

in a case in which the second determination is affirmative, perform a third determination of whether the communication terminal is no longer in the second area;

perform a closing operation of a vehicle door in a case in which the third determination is affirmative; and report cancellation of the closing operation of the vehicle door in a case in which any one of the first determination, the second determination, and the third determination is negative.

2. The vehicle control device of claim 1, wherein the processor is further configured to:

perform a fourth determination of whether the communication terminal is in the first area before the second determination perform the second determination after the fourth determination is affirmative.

3. The vehicle control device of claim 1, wherein the processor is further configured to:

perform a fifth determination of whether the communication terminal is not in the first area before the second determination; and perform the second determination after the fifth determination is affirmative.

4. The vehicle control device of claim 1, wherein the processor is further configured to:

perform a fourth determination of whether the communication terminal is in the first area before the second determination;

in a case in which the fourth determination is affirmative, perform a fifth determination of whether the communication terminal is no longer in the first area; and perform the second determination after the fifth determination is affirmative.

5. The vehicle control device of claim 1, wherein the first area is an area contained in the second area.

6. The vehicle control device of claim 1, wherein the first area is an area adjacent to the second area without being contained in the second area.

7. A vehicle control system comprising:

the vehicle control device of claim 1;

the communication terminal; and an actuator configured to perform drive opening and closing of the vehicle door under control of the processor.

8. A vehicle control method comprising:

performing a first determination for a first area indicating whether or not a communication terminal is in a first area outside a cabin of a vehicle;

performing a second determination for a second area indicating whether or not the communication terminal is in a second area that is farther away from the vehicle than the first area;

in a case in which the second determination is affirmative, performing a third determination of whether the communication terminal is no longer in the second area;

performing a closing operation of a vehicle door in a case in which the third determination is affirmative; and reporting cancellation of the closing operation of the vehicle door in a case in which any one of the first determination, the second determination, and the third determination is negative.

9. A non-transitory storage medium storing a program executable by a computer to perform vehicle control processing, the vehicle control processing comprising:

performing a first determination for a first area indicating whether or not a communication terminal is in a first area outside a cabin of a vehicle;

performing a second determination for a second area indicating whether or not the communication terminal is in a second area that is farther away from the vehicle than the first area;

in a case in which the second determination is affirmative, performing a third determination of whether the communication terminal is no longer in the second area;

performing a closing operation of a vehicle door in a case in which the third determination is affirmative; and reporting cancellation of the closing operation of the vehicle door in a case in which any one of the first determination, the second determination, and the third determination is negative.

* * * * *